US012800249B2

(12) United States Patent
Satten

(10) Patent No.: US 12,800,249 B2
(45) Date of Patent: *Nov. 17, 2026

(54) DIGITAL RECORDING OF FIREARM IDENTIFICATION

(71) Applicant: Darryl M. Satten, Huntington Beach, CA (US)

(72) Inventor: Darryl M. Satten, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/230,209

(22) Filed: Jun. 6, 2025

(65) Prior Publication Data

US 2025/0297823 A1 Sep. 25, 2025

Related U.S. Application Data

(63) Continuation-in-part of application No. 18/426,145, filed on Jan. 29, 2024, now abandoned, which is a continuation of application No. 17/808,024, filed on Jun. 21, 2022, now Pat. No. 11,906,256.

(60) Provisional application No. 63/214,163, filed on Jun. 23, 2021.

(51) Int. Cl.

*F41A 17/06* (2006.01)
*F41A 5/26* (2006.01)
*F42B 5/02* (2006.01)
*G06F 3/06* (2006.01)

(52) U.S. Cl.

CPC ............ *F41A 17/06* (2013.01); *G06F 3/0604* (2013.01); *G06F 3/0655* (2013.01); *G06F 3/0679* (2013.01); *F41A 5/26* (2013.01); *F42B 5/02* (2013.01)

(58) Field of Classification Search

None

See application file for complete search history.

(56) References Cited

U.S. PATENT DOCUMENTS

| | | | |
|---|---|---|---|
| 4,150,624 | A | 4/1979 | Hammond |
| 5,511,483 | A | 4/1996 | Griffin, Jr. |
| 7,111,423 | B2 | 9/2006 | Lizotte et al. |
| 7,204,419 | B2 | 4/2007 | Lizotte et al. |
| 7,533,614 | B1 | 5/2009 | Reich |
| 7,823,495 | B2 | 11/2010 | Martini Filho |
| 9,752,840 | B1 | 9/2017 | Betro |
| 11,092,415 | B2 | 8/2021 | Blank |

(Continued)

FOREIGN PATENT DOCUMENTS

WO 2004053422 A1 6/2004

OTHER PUBLICATIONS

DE 102012022894 A1 and English Translation (Year: 2014).*
Notice of Allowance on co-pending US application (U.S. Appl. No. 17/808,024) dated Oct. 18, 2023.

*Primary Examiner* — Reginald S Tillman, Jr.
(74) *Attorney, Agent, or Firm* — Alumen IP Law PC

(57) ABSTRACT

Digital Recording is provided using SWO technology wherein a microprocessor is located in a pistol and a single wire EEPROM is mounted on each cartridge used by the pistol. Power and data can be sent over a single wire from the microprocessor to the single wire EEPROM to communicate information about the pistol, such as the serial number, make, and model of the firearm. A system for recording a firearm discharged event has an authorized database that records at least GPS coordinates of an event related to the firearm discharge.

20 Claims, 7 Drawing Sheets

(56) References Cited

U.S. PATENT DOCUMENTS

| | | | |
|---|---|---|---|
| 11,248,891 B2 | 2/2022 | Koontz | |
| 11,906,256 B2 * | 2/2024 | Satten | F42B 35/00 |
| 2001/0011353 A1 | 8/2001 | Little et al. | |
| 2006/0213105 A1 | 9/2006 | Cugliari | |
| 2015/0074306 A1 | 3/2015 | Ayyagari et al. | |
| 2017/0221115 A1 | 8/2017 | Jarvis | |
| 2023/0228510 A1 | 7/2023 | Boettcher et al. | |

* cited by examiner

300

| A | B | C | D | E | F | G | H | I |
|---|---|---|---|---|---|---|---|---|
| No. | Serial No. | Date | Time | Accel | Wave | GPS Lat. | GPS Long | Local |
| 1 | 12345678 | 231011 | 1422 | 6.8 | 95 | 33.72385 | -117.94660 | |
| 2 | 12345678 | 231011 | 1422 | 6.8 | 95 | 33.72597 | -117.94575 | |
| 3 | 23456789 | 231012 | 1020 | 5.8 | 95 | 33.73836 | -118.03426 | Range |
| 4 | 23456789 | 231012 | 1020 | 5.8 | 95 | 33.73836 | -118.03426 | Range |
| 5 | 23456789 | 231012 | 1020 | 5.8 | 95 | 33.73836 | -118.03426 | Range |
| 6 | 23456789 | 231012 | 1020 | 5.8 | 95 | 33.73836 | -118.03426 | Range |
| 7 | 23456789 | 231012 | 1020 | 5.8 | 95 | 33.73836 | -118.03426 | Range |
| 8 | 23456789 | 231012 | 1020 | 5.8 | 95 | 33.73836 | -118.03426 | Range |
| 9 | 23456789 | 231012 | 1020 | 5.8 | 95 | 33.73836 | -118.03426 | Range |
| 10 | 23456789 | 231012 | 1020 | 5.8 | 95 | 33.73836 | -118.03426 | Range |
| 11 | 23456789 | 231012 | 1020 | 5.8 | 95 | 33.73836 | -118.03426 | Range |
| 12 | 23456789 | 231012 | 1020 | 5.8 | 95 | 33.73836 | -118.03426 | Range |
| 13 | 51234578 | 231012 | 1020 | 5.4 | 95 | 33.65323 | -117.96938 | School |
| 14 | 72345678 | 231013 | 1830 | 5.8 | 95 | 33.62619 | -117.92939 | Hospital |

FIG. 8

DIGITAL RECORDING OF FIREARM IDENTIFICATION

CROSS REFERENCE TO RELATED APPLICATION

This is a Continuation-in-part of application Ser. No. 18/426,145, filed on Jan. 29, 2024, which is a Continuation-in-part of application Ser. No. 17/808,204, filed on Jun. 21, 2022, now U.S. Pat. No. 11,906,256, which is a regular utility application of provisional Ser. No. 63/214,163, filed on Jun. 23, 2021, the contents of each of which are expressly incorporated herein by reference.

FIELD OF ART

The present disclosure generally relates to guns and ammunitions and specifically to a system and method involving the use of technology in pistols and ammunitions for recording data or information onto spent shells fired from semi-automatic pistols and/or regarding pistol usage.

BACKGROUND

Microscopic markings have been used for ballistics stamping. Markings can be engraved onto the tip of a firing pin and onto a breech face of a firearm with a laser or other means, such as etching. When the gun is fired, these etchings are transferred to the primer by the firing pin and to the cartridge case head by the breech face, using the pressure created when a round is fired. After being fired, shells released from the firing gun have microscopic markings imprinted on them that can then be examined by forensic ballistics experts to help trace the firearm to the last registered owner, at least in theory. However, microscopic markings recovered from spent shells have been less than optimal and have been known to be difficult to decipher by experts. Pursuant to California Gun Law AB 1471, the make, model, and serial number of the pistol are to be recorded onto the casings that have been fired and ejected by the pistol.

SUMMARY

Aspects of the invention include a combination pistol and cartridge comprising: a Single Wire Output (SWO) capable microprocessor located in the pistol; a single wire EEPROM; and wherein a single wire interface is provided when a part of the pistol contacts the single wire EEPROM located on the cartridge.

The part of the pistol that contacts the single wire EEPROM can be an extractor of the pistol.

The cartridge can be electrically grounded via contact with a metal barrel and slide.

The information can be written via the single wire interface when the extractor of the pistol contacts the single wire EEPROM.

The information can be written when the round is moved into the chamber of the pistol, before the round is fired.

The information can comprise a serial number of the firearm.

The information can include the make and model of the firearm.

The information can include GPS coordinates, a date, and a time related to the firearm discharged event.

The information can include any combination of serial number, make, model number, GPS coordinates, a date, and a time related to the firearm discharged event.

A method for manufacturing cartridges comprising the step of placing a substrate containing a single wire EEPROM onto a cartridge.

The method can comprise the step of placing a substrate containing a single wire EEPROM onto a second cartridge, onto a third cartridge, and onto a plurality of cartridges.

Aspect of the invention includes a cartridge having a single wire EEPROM mounted thereon. The cartridge can be understood as a round d of ammunition.

Aspects of the invention further include a cartridge comprising a bullet attached to a shell having an interior cavity containing gunpowder; and a substrate containing a single wire EEPROM mounted to an exterior of the shell.

A still further aspect of the invention includes a method of electronically microstamping a shell of a cartridge comprising: placing a SWO capable microprocessor in a frame or slide of a pistol; placing a substrate containing a single wire EEPROM onto the shell of the cartridge; forming a single wire interface between the SWO capable microprocessor and the cartridge; and communicating information from the SWO capable microprocessor to the single wire EEPROM.

The information transferred to the EEPROM can comprise a serial number of the pistol.

The information can further comprise a make and a model of the pistol.

The method can further comprise downloading additional data to the EEPROM.

The method wherein the additional data can comprise at least one of geographical location, time, and date that the cartridge is discharged.

A firearm having a handle and a trigger; a tracker assembly having a housing mounted to the firearm; wherein the tracker assembly comprises a plurality of electronic components mounted inside the housing, said plurality of electronic components comprising a GPS module and at least one sensor comprising an accelerometer.

The housing can be located in the handle.

The plurality of electronic components can further comprise a controller and a second sensor.

The second sensor can be a sound sensor or a decibel meter.

A rechargeable power supply can be mounted in the housing.

An indicator showing a status or a power level of the power supply can be incorporated with the tracker assembly.

The tracker assembly is mobile data ready.

The tracker assembly can comprise a transmitter and an antenna.

A communication module on the housing can be configured to communicate using SMS or MMS messaging.

A system for recording a firearm discharged event can comprise a firearm having a tracker assembly having a housing mounted to the firearm; wherein the tracker assembly comprises a plurality of electronic components mounted inside the housing, including a GPS module, and at least one sensor comprising an accelerometer; a cloud-based server for receiving information related to a firearm discharged event sent by the tracker assembly, said cloud-based server comprising an authorized database for recording the firearm discharged event.

The authorized database can record GPS coordinates, a date, and a time related to the firearm discharged event.

The authorized database can record a serial number of the firearm.

A method of recording an event related to a firearm discharge comprising detecting the firearm discharge with a sensor, transmitting a datafile to a server comprising an authorized database, and recording at least two of a serial number of the firearm, a date, a time, and GPS coordinates.

The method can further comprise evaluating data detected of the firearm discharge and only transmitting the data if a threshold value is satisfied.

BRIEF DESCRIPTION OF THE DRAWINGS

These and other features and advantages of the present devices, systems, and methods will become appreciated as the same becomes better understood with reference to the specification, claims and appended drawings wherein:

FIG. 8 is a snapshot of an authorized database showing exemplary information recorded by the database involving firearm discharged events.

DETAILED DESCRIPTION

The detailed description set forth below in connection with the appended drawings is intended as a description of the presently preferred embodiments of a writing system for digitally recording information onto a casing of a round, said information relates to the pistol that ejected the casing after the round has been discharged. Aspects of the invention further include device and system for detecting, sending, and recording information related to firearm discharged events. The writing system and tracker system embodied with aspects of the present devices, systems, and methods and are not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Figure 1:
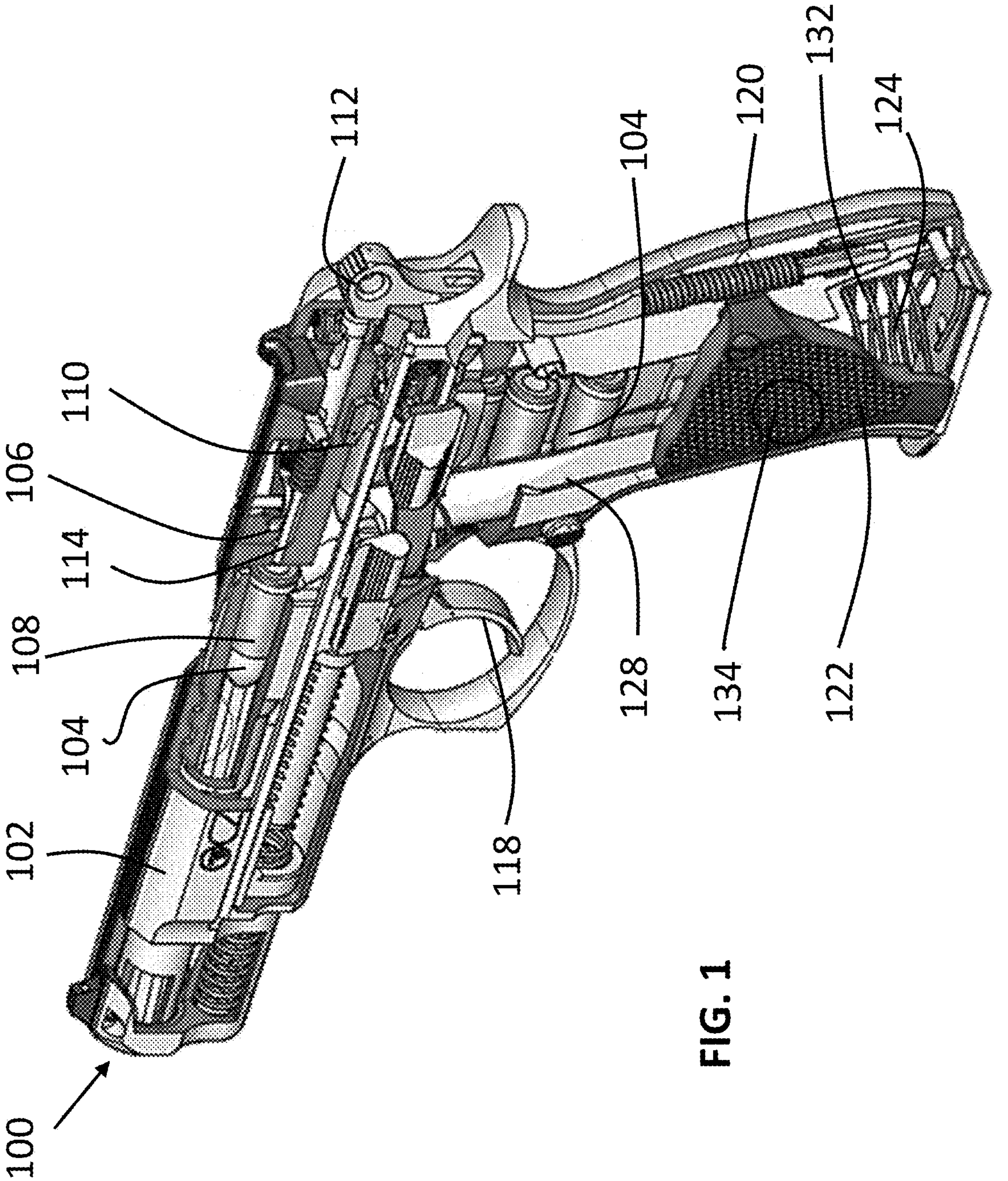
FIG. 1 a schematic perspective cutaway view of a semi-automatic pistol comprising a microprocessor.

With reference now to FIG. 1 a semi-automatic pistol 100 is shown in a partial cutaway perspective view to show various components of the pistol 100. As shown, the pistol 100 has a barrel 102, a round 104 loaded in the chamber to be fired on, an extractor 106 for gripping the extraction groove of the shell or casing 108, an ejector 110 that forces the retracted shell out of the ejection port of the gun, a hammer 112 for striking the firing pin 114 when the trigger 118 is pulled, and a handle 120 with a grip 122 and a magazine well 124. The magazine well can have a magazine body 128 located therein having a number of cartridges 104, also referred to as rounds or ammunitions.

In an example, a microprocessor 134 is located in the frame or slide 102 of the pistol, such as sealed in the frame or the grip. The microprocessor 134 is shown in the schematic and can comprise a power source, such as a battery. In an example, the microprocessor is a 1-wire master device that provides serial signaling to a 1-wire slave such that power and data can be sent over a single wire. The 1-wire slave can be provided with each cartridge 104 located in the magazine. Communication between the 1-wire master and the 1-wire slave can be provided when the extractor 106 contacts the extractor groove of the casing.

To accommodate the use of only 1-wire, the signaling protocol combines clock, data, and power in a single wire and ground return. The 1-wire slave may derive power through the use of an internal capacitor, which can be charged while the line is in the idled high state. The uniqueness of 1-wire technology is that device power and communication can be carried over a single contact. Further information regarding one (1) wire technology and 1-wire protocol, including information regarding programming information to the processor for writing or transferring all or a subset of the information onto a substrate, such as an EEPROM, are disclosed in US Pub. No. 2015/0074306 to Ayyagari et al., No. US2013/0019039 to Herklots, and No. US2001/0030617 to Cusey, the contents of which are expressly incorporated herein by reference.

Additional information regarding 1-wire technology is available from Dallas Semiconductor Corp., which designed the 1-wire bus system utilized in 1-wire technology. Examples of microprocessors that utilize Serial Wire Output (SWO) are ARM Cortex microprocessors developed by STMicroelectronics.

In an example, an electronic writing system is provided for connecting with cartridges used in a pistol digital memory. A microprocessor for writing information, including the serial number, make, and model of the pistol that ejects the spent cartridge. SWO is implemented by a microprocessor. Memory can be placed on a dielectric substrate attached to a metallic cartridge at the ejector groove of the metallic cartridge. When a round or ammunition 104 is loaded into the chamber of the pistol, the casing makes contact with the extractor 106, which via one-wire protocol, writes information into or onto the EEPROM mounted with the casing of the ammunition, before the round is fired.

Electrical power needed to supply the microchip or microprocessor 134 can be a battery 132 located somewhere in the firearm such as the frame, grips, or magazine. The conductor carrying the data signal from the microprocessor embedded in the firearm to the cartridge can come across the extractor 106 that contacts the casing 108 (FIG. 2) of the cartridge 104 when the cartridge is loaded into the chamber before the round is fired. In some examples, if the read/write system of the present invention is interfered or tampered with by a user, the gun can be rendered to lock and not allow firing. For example, if the microchip 134 loses power, if the extractor is interfered with, and/or if non-approved cartridges are used without the dielectric substrates or EEPROMs, to name a few non-limiting examples, the system can cause the trigger to be locked and/or the hammer to be locked or disabled. Any number of actuated cylinders or drive mechanisms may be used to disable the gun in the event the electronic writing system is interfered or tampered with.

Figure 2:
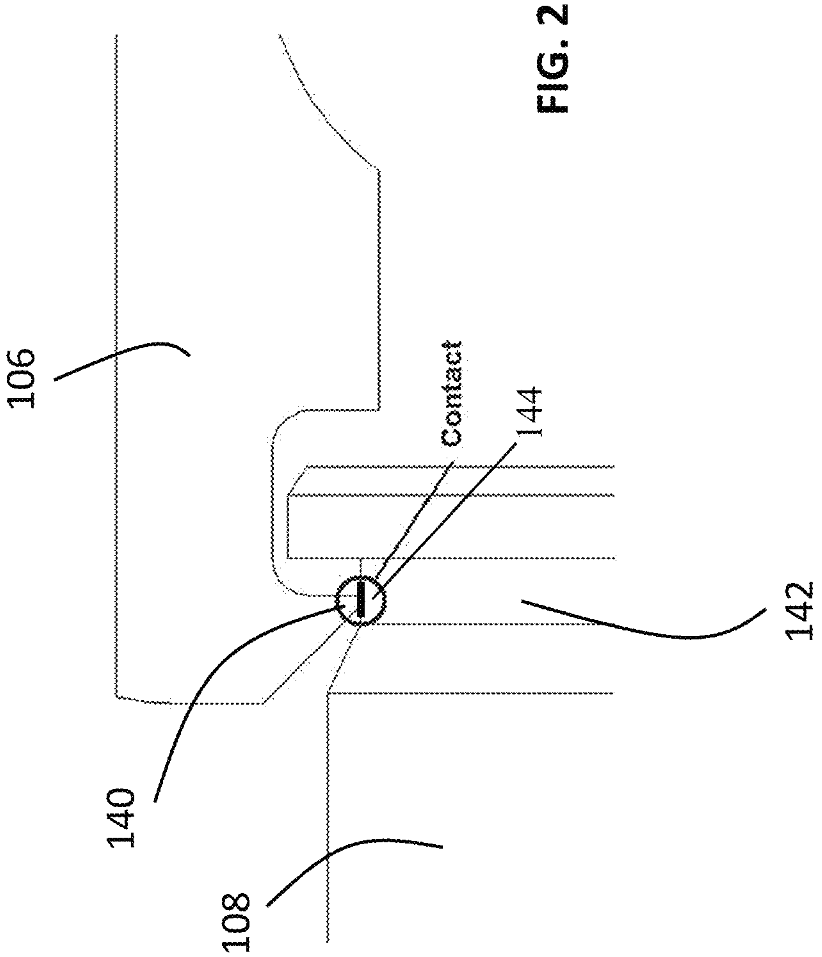
FIG. 2 is schematic view showing an extractor contacting a casing to provide one wire interface between the microprocessor located in the pistol and the memory located on the casing.

With reference now to FIG. 2, a schematic side view of an extractor 106 having a hook end 140 that grips the extraction groove 142 of a casing 108 of a cartridge is shown. Contact shown between the two can provide the single wire interface (SWI) needed to initiate data transmission from the microprocessor 134 on the pistol to the EEPROM 144 located on the shell or cartridge 108. The tip of the extractor 106 acts as an electrode for transmitting data from the microprocessor onto the EEPROM. In exemplary embodiments, the EEPROM 144 is located or mounted on a shell or cartridge 108 using adhesive, interference or pressed fitting the EEPROM in a corresponding slot or groove on the shell, securing the EEPROM to a ring or a band, such as high-temperature resistant non-metallic material, and gripping the shell exterior with the band. In an example, the microprocessor 134 (FIG. 1) for writing information onto the EEPROM 144 via the 1-wire protocol includes at least one of the serial number, make, and model of the pistol that ejects the spent cartridge. In some examples, the information includes at least two of or all the following information: the serial number, make, and the model of the pistol that ejects the spent cartridge. In still other examples, the information recorded onto the memory 144 located on the spent cartridge can include GPS coordinates, a date, and a time related to the firearm discharged event. In still other examples, a location corresponding to the GPS coordinates can be recorded onto the memory 144. For example, GPS coordinates 12.345 and −456.78 can be identified as Washington Park. Further information about a GPS module for writing GPS coordinates onto the memory of the spent cartridge is further discussed below.

Overall cost of implementation would include the non-recurring cost of the microprocessor built into the firearm and the electrode embedded in the extractor. Recurring cost would include the battery located somewhere within the firearm and the non-volatile memory attached to the ammo cartridge. Furthermore, old stock ammo can be easily modified by simply adding a band or ring of substrate containing the non-volatile memory. This method can be used on both rimmed and rimless ammo with 22-caliber being the best example of rimmed ammunition.

Methods of making and of using firearm electronic equivalent microstamping and components thereof are within the scope of the present invention. For example, aspects of the invention include a method of making of manufacturing pistols with SWO capable microprocessors and cartridges with one wire EEPROM. In some examples, the method comprises fitting existing ammunition with an elastic substrate having the single wire EEPROM placed around the exterior of the casing, at the extractor groove, for contact by the extractor.

RF technology is contemplated. For example, passive RFID tags can be placed onto each cartridge or ammo sold at brick-and-mortar stores. When a user purchases a supply of cartridges, the user must provide the seller with the make, model, and serial number of the pistol that the cartridges are intended to use with. The store worker can then write the information onto each of the RFID tags. If information on the cartridges match information on the gun, then the gun can fire. If information on the cartridges does not match information identifying the pistol, the gun can be electronically disabled.

Figure 3:
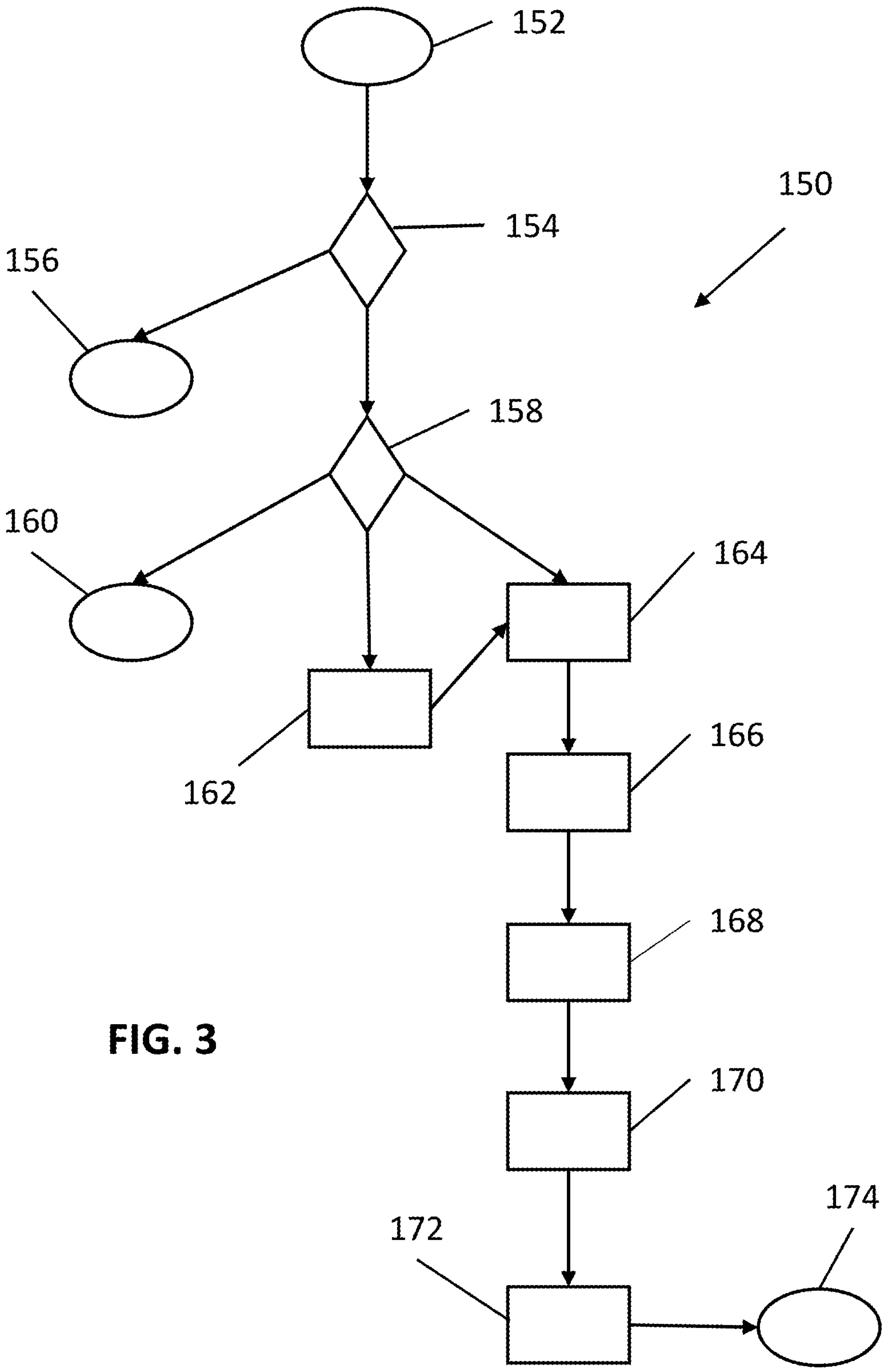
FIG. 3 is a process flow diagram for writing at least one of the make, model, and serial number on a spent cartridge of a pistol that ejected the spent cartridge.

With reference now to FIG. 3, a process flow diagram for writing at least one of the make, model, and serial number on a spent cartridge of the pistol that ejected the spent cartridge is shown, which is generally designated 150. The process starts 152 with first queering at 154 whether the pistol or handgun is equipped with a microprocessor. If no, then the process ends at 156. If yes, then the microprocessor is programmed with at least one of the make, model, and serial number of the pistol, including with one or more of the noted information. In still other examples, the microprocessor is programmed to record GPS coordinates, a date, and a time related to the firearm discharged event. In still other examples, a location corresponding to the GPS coordinates can be recorded onto the memory 144. Optionally, the microprocessor is programmed to record any combination of the noted information onto the memory located on the spent cartridge, via one-wire protocol when communication is made between the 1-wire master and the 1-wire slave, such as wen the extractor 106 contacts the extractor groove of the spent casing. Next, the process queries whether the round or ammunition is equipped with a writeable memory, such as an EEPROM, at step 158.

If the ammunition is not equipped with a writeable memory, such as an EEPROM, the process ends at 160. If the ammunition is equipped with the writeable memory, then the process can move to step 164. The process moves to step 162 if the ammunition is not equipped with a writeable memory but can be retrofitted with a writeable memory, as discussed elsewhere herein. The process can then move to step 164.

At step 164, the ammunition can be loaded into the chamber of the pistol. This may first require loading the ammunition into a magazine, loading the magazine into the pistol, and then loading the ammunition into the chamber. As the shell or cartridge moves into the chamber of the pistol, the cartridge contacts the extractor of the pistol, which then, via one-wire protocol, writes information into or onto the writeable memory mounted with the casing at step 166. The information can include at least one of the serial number, make, and the model of the pistol that the ammunition is used with, which will ultimately eject the spent cartridge once the round is fired. In still other examples, the information can include GPS coordinates, a date, and a time related to the firearm discharged event. In still other examples, a location corresponding to the GPS coordinates can be recorded onto the memory 144. Optionally, the information recorded onto the memory on the spent cartridge can be any combination of two or more of the noted information. At step 168, the pistol can be discharged to fire the round that has a writeable memory mounted therewith, such as an EEPROM, and that received information stored in the microprocessor located with the pistol, such as the serial number, make, the model of the pistol, GPS coordinates, a date, and a time related to the firearm discharged event, or combinations thereof.

Once the round is fired, the empty shell can be ejected at step 170. The empty shell with the writeable memory can then be collected and information written onto or into, to be considered synonymous terms, the writeable memory can then be read at step 172. Reading data from the chip can involve selecting the target storage, such as by sending a dummy write command to load in the target address. Next, one byte is sent containing the device address and the read/write bit as 1. The EEPROM chip then sends one byte of data in return, which can then be read by a user. Thus, in an example, an empty shell that has been fired by a pistol can be collected and information about the pistol that fired the round with the empty shell can be obtained, such as the make, model, serial number of the pistol that fired the round, GPS coordinates, a date, and a time related to the firearm discharged event, or combinations thereof. The process then ends at 174 or can repeat beginning at 154, 158, 162, or 164.

Figure 4:
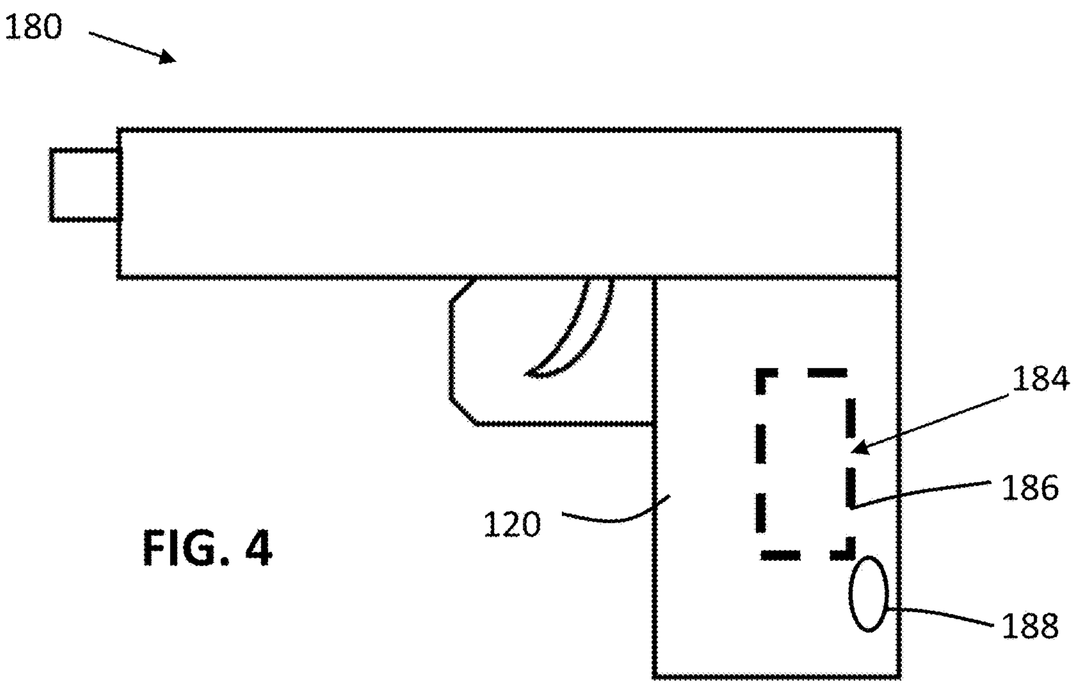
FIG. 4 is a schematic drawing of a firearm incorporating a tracker assembly in accordance with aspects of the invention.

With reference now to FIG. 4, a schematic diagram of a firearm 180 is shown, which can be a semi-automatic pistol and can be similar to the pistol of FIG. 1 with a few exceptions. In the present embodiment, a tracker assembly 184 is incorporated with the firearm, such as in the handle 120 portion of the firearm 180. As further discussed below, the tracker assembly 184 has a housing 186 having electronic components integrated therein. The housing 186 can be fixedly secured inside the firearm, such as in the magazine well at the handle. The housing can be mechanically or electronically coupled to a trigger bar that is connected to the trigger. Thus, any tampering of the tracker assembly can disable the trigger bar, which blocks movement of the trigger and prevents the pistol from firing. The tracker assembly can comprise an electric motor or an actuator for manipulating the trigger bar. For example, when the tracker assembly is in a fail or fault state, the electric motor or actuator can block movement of the trigger bar.

The tracker assembly 184 is configured to detect an event each time the firearm having the tracker assembly is fired. Thus, if the firearm is fired five times, as an example, then the tracker assembly 184 is configured to detect five events, which is understood as five firearm discharged events caused by the firearm having the tracker assembly 184 mounted therein. The detected events can be transmitted as data to a remote server, such as a cloud-based server, having a database for recording the transmitted data. Alternatively, as discussed above, information about the detected events can be recorded onto the memory located on the one or more spent cartridges. In various embodiments, an event may be detected by the tracker assembly 186 but not transmitted unless a certain threshold is reached. The threshold can be selected to correspond to when a gun is discharged. For example, when a gun is discharged, the gun recoils at some minimal acceleration, produces a loud sound of certain decibels, and the loud sound has one or more associated soundwaves. One or more of these indicators, e.g., acceleration, loud sound, and soundwaves, can be used as input to initiate a recordable event by the tracker assembly and can be transmitted by the tracker assembly to the remote server for recording after tracker assembly determines that the one or more indicators satisfy threshold values that are indicative of an actual firearm discharge, as compared to dry firing, as an example.

The tracker assembly can detect and capture multiple data points related to each firearm discharged event. In other words, information related to each firearm discharged event can include more than one data point. For example, each firearm discharged event can include one or more of GPS coordinates of where the event was detected, time of the event, date of the event, and the pistol's serial number that triggered the event. Other data points related to the firearm discharged event can be detected and recorded. For example, the make and model of the firearm, the name of the registered firearm owner, and data sensed by the one or more sensors. In some examples, the information related to the firearm discharged event is recorded by the tracker assembly for purposes of transmitting to a remote server only, but not stored locally on the tracker assembly, such as in a flash drive. In some examples, a local memory can record information related to each firearm discharged event generated by the firearm, but the stored information is only accessible by an authorized personnel, using encryption, duo authenticity, or other safeguards. In some examples, the tracker assembly 186 can record an event only when the two or more thresholds are reached, which can be viewed as a false positive provision for avoiding recording of non-events. In some examples, the information can be recorded onto the memory of the spent cartridge for which the discharged event was detected. In some examples, the information can be recorded on the spent cartridge, transmitted to the remote server, recorded locally in a storage memory mounted on the firearm, or combinations thereof.

Figure 5:
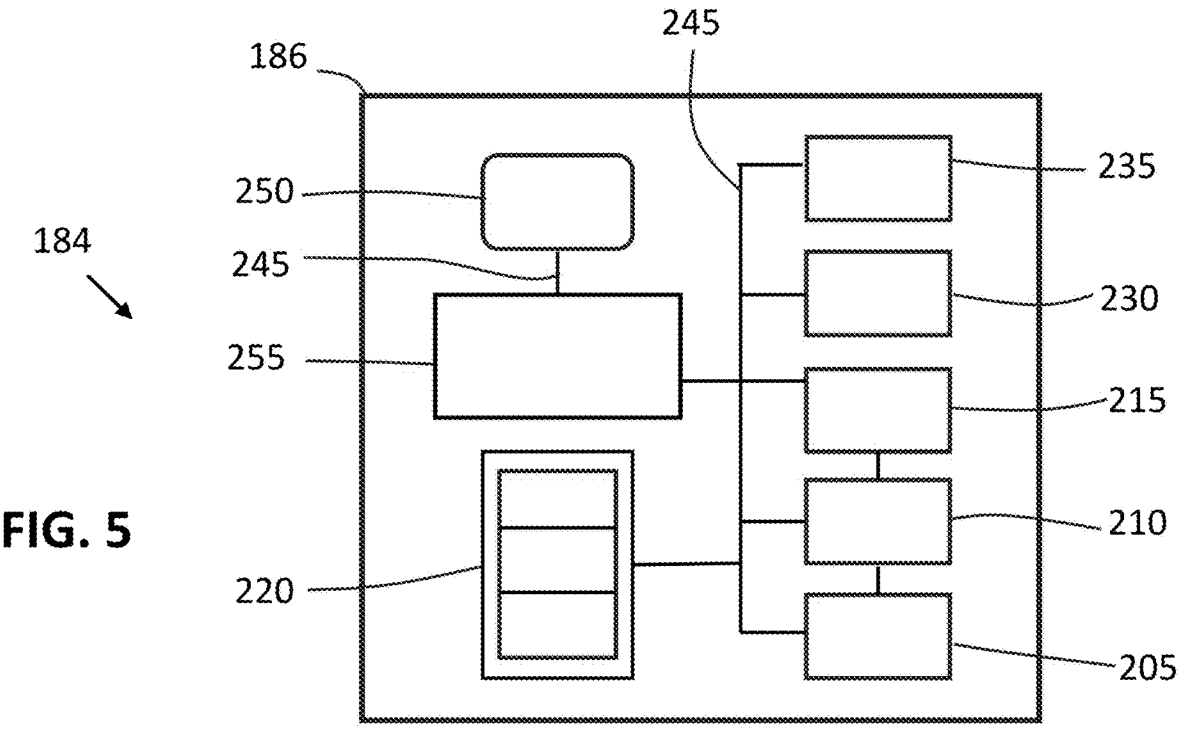
FIG. 5 is a schematic component view of the tracker assembly of FIG. 4.

With reference now to FIG. 5, a schematic diagram is provided showing exemplary electronic components of an embodiment of the tracker assembly 186 in accordance with aspects of the invention. In the embodiment shown, the components are located inside a housing 186, which can be a tamperproof housing. The components may comprise communications circuitry or module 205, a rechargeable power supply and power management circuitry 210, a processor circuitry 215, a memory 220, which can be a solid state drive, network interface circuitry 230, an input/output (I/O) interface 235, one or more sensors 250, and a sensor hub 255. The various components are coupled with one another via a bus 245. In other examples, fewer or additional components may be incorporated with the tracker assembly 186. For example, the communications module can comprise a transmitter and an antenna for communicating to a remote server through a mobile network. The tracker assembly is equipped with electronics that enable the tracker assembly to sense signals or indicators related to a firearm discharge, evaluate the sensed signals or indicators to confirm that they are from an actual firearm discharged event, such as by looking at signatures that are indicative of a firearm discharge, and transmit the information related to the firearm discharged event to a remote server to record information related to the firearm discharged event and/or record the information onto the memory of the spent cartridge. In an example, the recorded information includes the firearm's serial number, the date and time of the firearm discharged event, and GPS coordinates of where the discharged event occurred.

In an example, the one or more sensors 250 can include an accelerometer, a sound sensor, and a GPS module. The memory 120 can be a RAM memory containing software configured for system startup and for system registration, as further discussed below. The I/O interface and communications module can include a transmitter and an antenna for turning data processed by the processor circuit to radio waves that are then transmitted via a mobile network, which then transmit the data to a provider data center, which can then forward the data to a final destination, which can be a cloud server that records and tracks firearm discharged events, as further discussed below.

The tracker assembly 184 is preferably mobile data enabled to operate with current and future network generations and is backward compatible with earlier network generations, such as 4G LTE and 3G. The mobile data enabled tracker assembly allows captured data of firearm discharged events to be transmitted to a remote server for recording and cataloging, as further discussed below.

The one or more sensors can include a decibel meter, also referred to as a sound pressure level (SPL) meter for measuring sound levels or sound pressure and an accelerometer. In another example, the one or more sensors can include a sound sensor for capturing and evaluating waveforms. Regardless of which type of sensor is incorporated or whether two or more of the sensors are incorporated with the tracker assembly 184, the sensors can be set to record events only if acceptable minimum thresholds are met. For example, the decibel meter should be selected to record only at a dB level that is certain of a gunshot sound and disregards sound from a noisy object, such as a motorcycle. Since firearms generate a very loud sound, in the order of around 140 dB, setting the proper threshold using a decibel meter is a viable option.

Acceleration is the rate of change of the velocity of an object with respect to time. Acceleration is measured in "m/sec^2" in the metric system or "ft/sec^2" in the US system. Depending on a number of factors, such as the slug size and the amount of powder or energy used to discharge the slug, the recoil acceleration can vary for different sized guns and ammo. A chart can be calibrated to measure recoil accelerations for the various guns and ammo and programmed in the controller to detect, evaluate, and record for purposes of transmitting to a remote server when a particular acceleration threshold is reached that is indicative of a gun discharge, as opposed to when the gun is dropped, as an example.

A sound sensor can be incorporated in the tracker assembly to record and evaluate sound waveforms of gunshot signals, also known as acoustic gunshot signals. When a gun or firearm is discharged, the sound signals produced consist of a high amplitude and a short duration impulsive sound known as the muzzle blast and the shockwave. A chart can be calibrated to measure the muzzle blasts and the shockwaves of different firearms and programmed in the controller to detect, evaluate, and record for purposes of transmitting to the remote server. Thus, when waveforms are matched that are indicative of a gun discharge, as opposed to random sound waveforms, the controller can then initiate the communications module to transmit the data.

The tracker assembly can be powered by a rechargeable power supply that is controlled by the power management circuitry. Because the housing 186 is tamper proofed, the power supply can be wirelessly recharged or a sealed cap 188 on the pistol can be removed to expose a power port for recharging the power supply, such as with a USB-C cable or DC adaptor. In some examples, power level indicators can be included to convey the power supply level of the power supply. A magnetic switch can be incorporated for powering up the tracker assembly 184. The magnetic switch can be configured to be in the off state when magnetized by a magnetic pole, such as when a magnet is located adjacent to the tracker assembly 184. When in the off state, such as when the operator of the firearm moves the magnet away from the tracker assembly, a shape memory device, an electric motor (e.g., a direct current motor, an electrostatic motor, and/or a servo motor), an electromagnet, or combinations thereof may directly or indirectly block a trigger bar to prevent the trigger for moving, thereby preventing triggering of the pistol, as disclosed in US Pub. No. 2018/0142977, the contents of which are expressly incorporated herein by reference for all purposes. The system can be configured to be on or in an active state when the magnetic pole is terminated, such as when magnet is moved away from the pistol. When in the active state, the tracker assembly 184 does not directly or indirectly block the trigger bar to block the trigger from triggering. The tracker assembly 184 preferably has no user interface with the user other than the power level indicators and the power charging port. This prevents the user from tampering with the tracker assembly.

Figure 6:
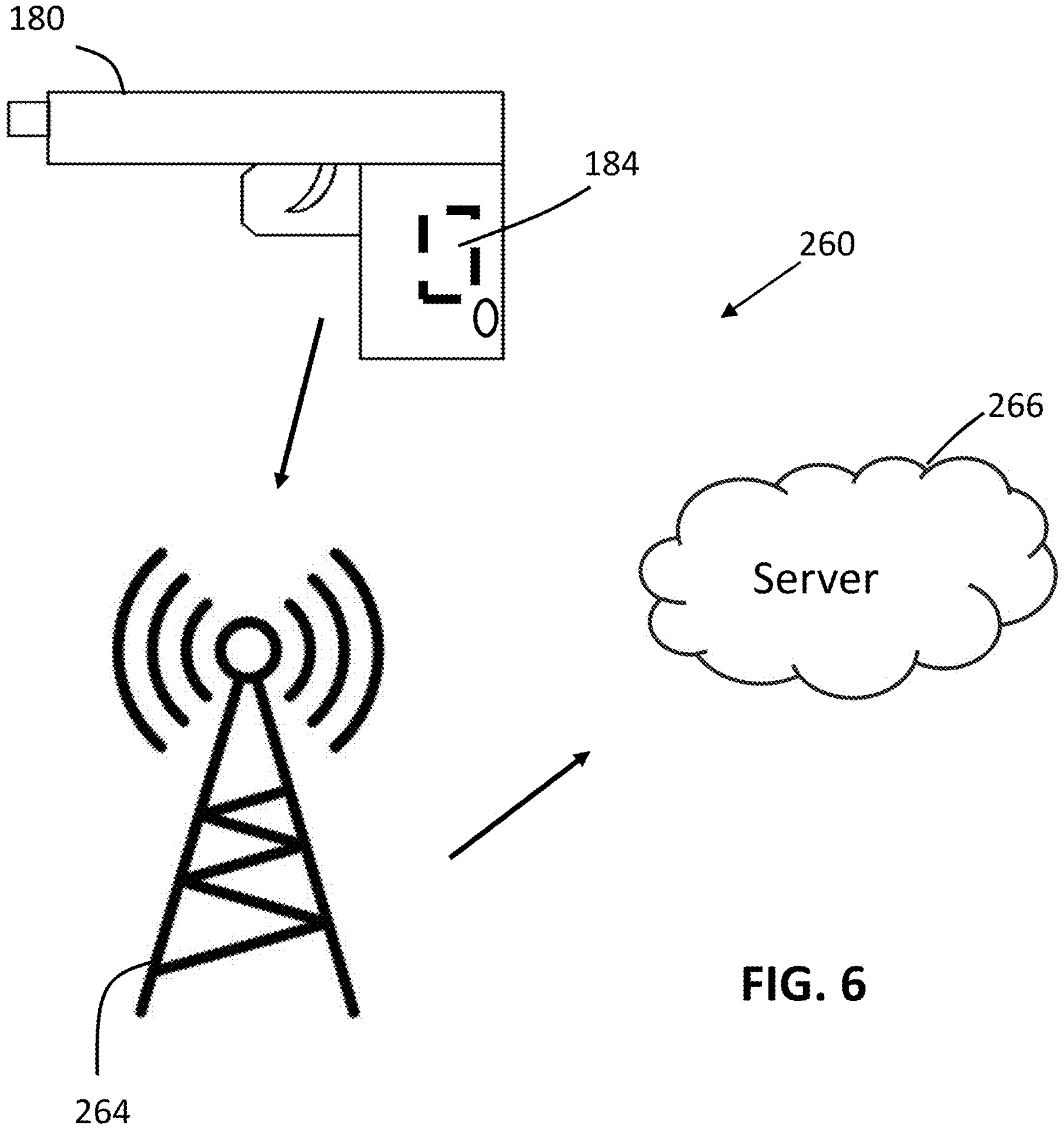
FIG. 6 is a system for detecting, sending, and recording firearm discharged events.

Turn now to FIG. 6, a system 260 for recording a discharged event in accordance with aspects of the invention is shown. In an example, the system 260 comprises a firearm 180 having a tracker assembly 184 in accordance with the invention mounted therewith, cell towers 264 or a network of cell towers, and a server 266, which can be a cloud-based server. The system 260 is configured to record firearm discharged events data at the server 266, which have been generated by the firearm 180 and which data have been transmitted by the tracker assembly located on the firearm. As discussed above, when the firearm 180 discharges a live round, the one or more sensors on the tracker assembly detects a sound level, a recoil acceleration, and/or gunshot waveforms associated with the discharge. The data can be timestamp and can include the date and time of the discharged event. If one or more of the detected data satisfy set thresholds, a protocol having the one or more detected data along with the time stamp, GPS coordinates from a GPS module mounted on the tracker assembly, and the serial number of the firearm can be transmitted to the nearest cell tower, typically via radio waves, which can then be sent to a data center and then from there to a service provider, website, or server. Alternatively or in addition therewith, information related to the discharged event is recorded onto the memory located on the spent cartridge via a 1-wire protocol, as previously discussed. The server, such as one belonging to a state or a federal agency, or a private server authorized by the state or federal agency to track, then processes the protocol or message, such as unpack the message, and records the received data in a database, which can be called an "authorized database". The recorded data can be retrieved by designated authorities as part of wellness checks or in connection with investigations as needed.

In some examples, the information relayed to the server 266 can be SMS messaging, which can contain 160 characters or fewer. Thus, a software can be programmed to record information related to the discharged event in SMS message for transmitting to the remote server 266. Alternatively, MMS messaging may be used, which allows up to 1,600 characters and media, such as images, videos, and audio files. Thus, when using MMS messaging, an audio file of the actual event may be part of the sent information. Optionally, an image file of the sound waveform that generated the event may be part of the sent information. In still other examples, information sent to the remote server using any known prior art or future protocols or packets.

In some examples, the tracking assembly in accordance with aspects of the invention may communicate to a remote server using means other than through direct mobile data. For example, the information may be sent via WiFi or Bluetooth connectivity to a cellphone or a local network, or through a gateway to then communicate to a remote server.

Figure 7:
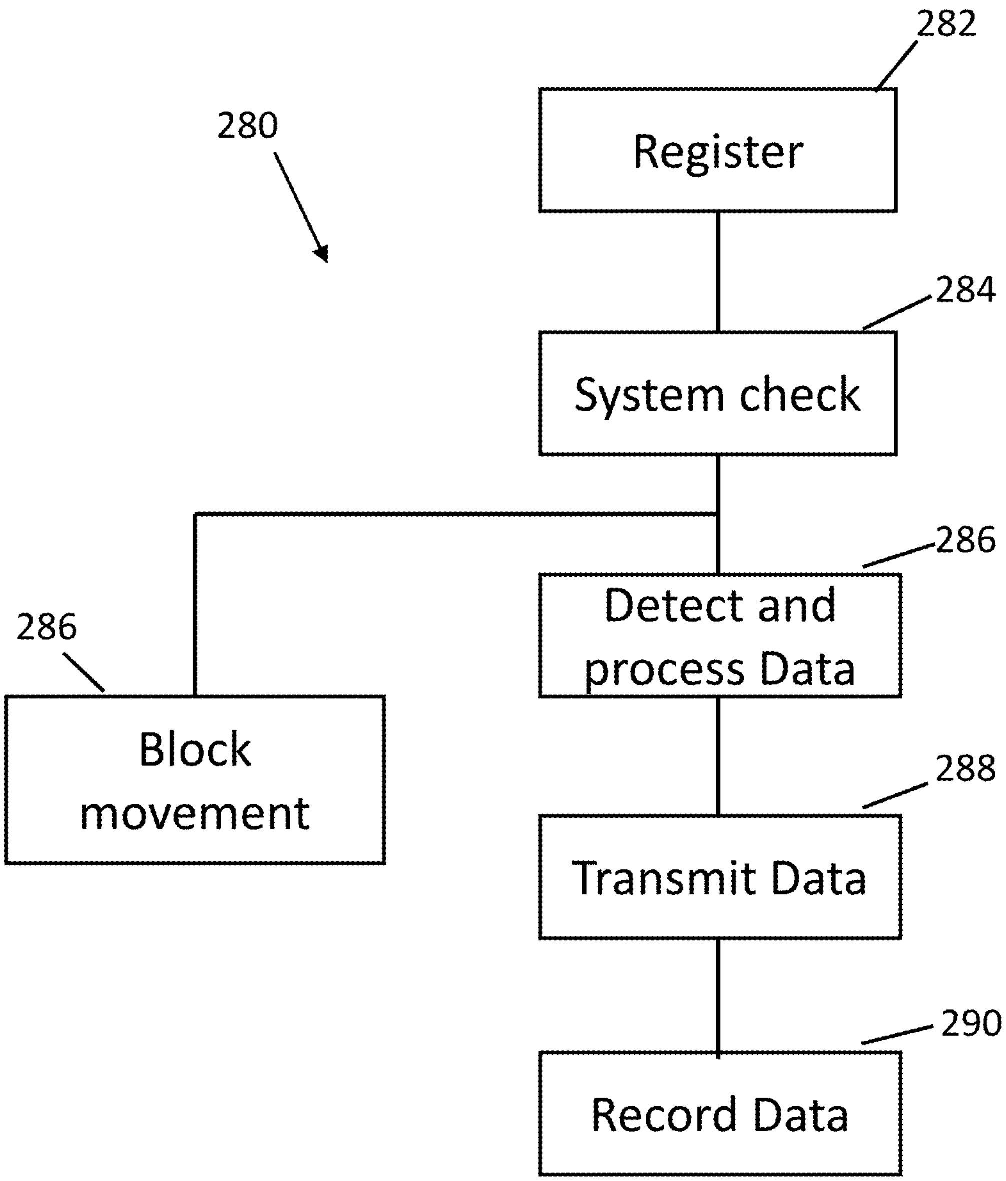
FIG. 7 is a flow chart depicting a process for registering and using a firearm having a tracker assembly in accordance with aspects of the invention.

With reference now to FIG. 7, a process flow diagram 280 depicting a process for recording firearm discharged events in accordance with aspects of the invention is shown. In an example, the firearm's registered owner can begin at step 282 by registering the firearm with the proper legal authority, which can vary from state to state. The tracker assembly 184 (FIG. 4) can be initiated with a registration protocol by communicating with an application at an authorized dealer, which can record the firearm's serial number, name of the firearm owner, and optionally other information, such as the number of times the tracker assembly has recorded a discharged event for the registering pistol, the serial number of the tracker assembly, etc. The authorized dealer then links the tracker assembly on the firearm to the authorized database so that firearm discharge events generated by the registered pistol are automatically transmitted to the remote server to record. The registered gun owner can then sign up for a mobile data plan in order for the gun to operate. Thereafter, the registered gun owner can use the gun to discharge as needed or as the case may be and the discharged event can automatically transmit to the remote server for recording in the authorized database.

At step 284, the registered gun owner can attempt to discharge the gun, such as at a shooting range. Upon chambering a round, the tracker assembly can be toggled or activated to run through a system check to verify that all components are operational ready. If the tracker assembly encounters issues, such as a bad I/O interface, no mobile data, or the gun has otherwise been tampered with, then a motor can disable the trigger bar on the firearm to block movement of the trigger and prevents the firearm from firing at step 286. If the system check is good and shows the tracker assembly operational, then the process moves to step 286 and allows the trigger to be depressed to discharge a round. As previously discussed, if the one or more sensors detect signals that meet certain conditions or thresholds, then the controller will enable the communications module to send data at step 288 to the remote server to record the discharged event on the authorized database at step 290. The recorded data on the authorized database can include detected data from the one or more sensors, a time stamp, which can have a date and a time of when the event was detected, the serial number of the firearm that generated the sensed data, and GPS coordinates where the firearm was discharged, among others.

In another example, a system is embedded within a pistol frame that can report date, time, and location of the discharge of a pistol. An exemplary system can be a transmitter. For example, when the tracker assembly is outside of an operational cell tower, the recorded information can be transmitted the next time the firearm with the tracker assembly is located near an operational cell tower. The device can use short messaging service (SMS) like that used by cell phones. A microprocessor keeps track of the current date, time, and GPS location. An accelerometer placed within the pistol acts as a sensor to determine if the pistol has actually discharged a live round. This is to prevent a false report of discharge due to dry firing the weapon, as an example, or due to the gun being accidentally dropped. When the microprocessor determines that a live round has been fired, it sends an SMS text containing the make, model, serial number, registered owner's name, date, time, and location of discharge to the appropriate authorities determined by law. The device can be powered by a battery embedded in the receiver. Further design features can inhibit the pistol from discharging if the microprocessor fails due to tampering or no power. An indicator can be incorporated on the receiver to show whether the system is operational. If the system is deemed nonoperational, a spring-loaded switch such as the magazine disconnect lever or firing pin block can prevent the pistol from discharging. If an "inop" indication is shown, the gun can be configured so that only a gunsmith can repair the weapon and reset the microprocessor for service. Any tampering can constitute a reporting event that will be automatically reported to the authorities similar to a bi-annual automobile smog check.

FIG. 8 is a snapshot of an exemplary authorized database 300 showing various information recorded on the database. In the example shown, a remote server records information sent to it by a number of different tracker assemblies on different firearms as described hereinabove. The database can record information such as the firearm's serial number, the date and time the discharge of the firearm caused the tracker assembly to report, the acceleration, which can be normalized in "g" detected by the accelerometer, information detected by the sound sensor, such as the percentage confidence report that the waveform is from a gunshot sound wave, and GPS coordinates, such as the GPS latitude and GPS longitude. Optionally, the location corresponding to the GPS coordinates can be identified, such as "school", "hospital", "residential", "park", "range" (i.e., shooting range), and "church", to name a few examples. In other examples, fewer or additional information can be sent by the tracker assembly and recorded in the authorized database by the server. For example, the registered owner's name and the firearm's make and model may be included.

Aspects of the invention include an electronic writing system for writing information onto a casing of an ammunition or round, a firearm having the electronic writing system, and a round or ammunition having a writeable memory, such as an EEPROM, mounted onto the casing of the ammunition. Aspects of the invention further include a device and a system having one or more sensors for detecting a gun discharge and then sending information regarding the gun discharge to a remote server to record the gun discharge as a recordable event. The information recorded can include the serial number of the firearm, the GPS location of where the discharge occurred, and a time stamp, among others. Methods of making and of using the electronic writing system and rounds with writeable memories and components thereof are within the scope of the present invention.

Although limited embodiments of an electronic writing system for writing information onto a casing of an ammunition or round and embodiments of a tracker assembly for detecting and sending gun discharge information to a remote server and associated components for utilizing the electronic writing system and tracker assembly have been specifically described and illustrated herein, many modifications and variations will be apparent to those skilled in the art. For example, while the firearm is depicted as a semi-automatic pistol, the tracker assembly is adapted for use with other firearms, such as long range rifles, shotguns, AK-47s, and other high power rifles. Accordingly, it is to be understood that the devices, systems, and assemblies and their components constructed according to principles of the invention may be embodied in other than as specifically described herein. The disclosure is also defined in the following claims.

What is claimed is:

1. A firearm comprising:
- a handle, a trigger, and a cartridge;
- a tracker assembly having a housing mounted to the firearm;
- a Single Wire Output (SWO) capable microprocessor located in the firearm;
- a single wire EEPROM located on the cartridge;
- wherein a single wire interface is provided when a part of the firearm contacts the single wire EEPROM; and
- wherein the tracker assembly comprises a plurality of electronic components mounted inside the housing, said plurality of electronic components comprising a GPS module and at least one sensor.

2. The firearm of claim 1, wherein the housing is located in the handle.

3. The firearm of claim 1, wherein the plurality of electronic components further comprise a controller and a second sensor.

4. The firearm of claim 1, wherein the part of the firearm that contacts the single wire EEPROM is an extractor.

5. The firearm of claim 1, wherein information about a discharged event is recorded onto the single wire EEPROM when the single wire interface is provided.

6. The firearm of claim 1, wherein the discharged event information contains information about one or more of a serial number of the firearm, make of the firearm, model of the firearm, GPS coordinates of where the discharged event occurred, a date, and a time related to the firearm discharged event.

7. The firearm of claim 6, wherein a location description corresponding to the GPS coordinates is recorded on the single wire EEPROM.

8. The firearm of claim 6, wherein the GPS coordinates are transmitted to a remote server.

9. The firearm of claim 1, further comprising an indicator showing a status or a power level of the power supply.

10. The firearm of claim 6, wherein the tracker assembly is mobile data ready.

11. The firearm of claim 6, wherein the tracker assembly comprises a transmitter and an antenna.

12. The firearm of claim 8, wherein the GPS coordinates are transmitted only after a sound threshold is met, an acceleration threshold is met, acoustic gunshot signals are matched, or combinations thereof.

13. A system for recording a firearm discharged event comprising:

a firearm having a tracker assembly having a housing mounted to the firearm; wherein the tracker assembly comprises a plurality of electronic components mounted inside the housing, including a GPS module, and at least one sensor;

a Single Wire Output (SWO) capable microprocessor located in the firearm;

a single wire EEPROM located on a cartridge; and wherein a single wire interface is provided when a part of the firearm contacts the single wire EEPROM.

14. The system for recording a firearm discharged event of claim 13, further comprising a cloud-based server for receiving information related to a firearm discharged event sent by the tracker assembly, said cloud-based server comprising an authorized database for recording the firearm discharged event.

15. The system for recording a firearm discharged event of claim 13, wherein the authorized database records GPS coordinates, a date, and a time related to the firearm discharged event.

16. The system for recording a firearm discharged event of claim 13, wherein the electronic components further comprise a controller and a second sensor.

17. The system for recording a firearm discharged event of claim 16, wherein the first sensor is an accelerometer and the second sensor is a sound sensor or a decibel meter.

18. The system for recording a firearm discharged event of claim 17, further comprising a rechargeable power supply mounted in the housing.

19. The system for recording a firearm discharged event of claim 18, wherein a communication module on the housing is configured to communicate using SMS or MMS messaging.

20. The system for recording a firearm discharged event of claim 13, wherein the authorized database records a serial number of the firearm.

* * * * *